J. H. Tracy.
Grab Hook.
N° 94,926.  Patented Sep. 14, 1869.
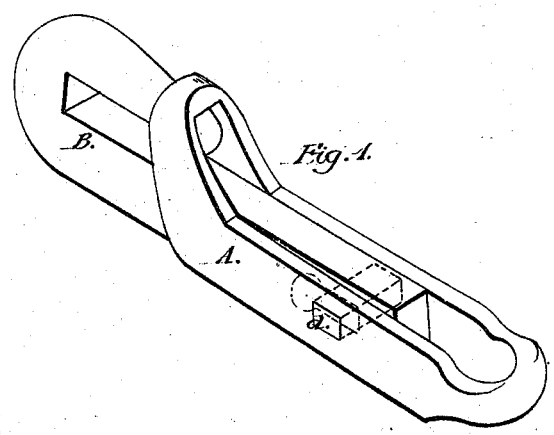
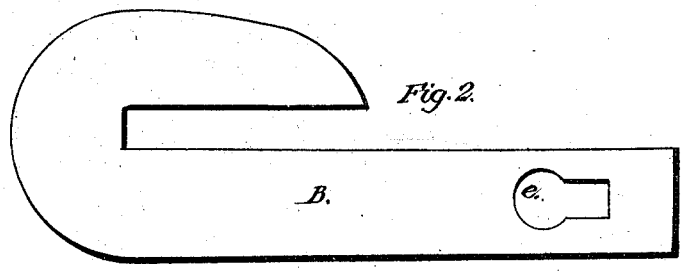

United States Patent Office.

JAMES H. TRACY, OF MAYVILLE, MICHIGAN.

Letters Patent No. 94,926, dated September 14, 1869.

IMPROVEMENT IN HOOKS.

The Schedule referred to in these Letters Patent and making part of the same.

*To all whom it may concern:*

Be it known that I, JAMES H. TRACY, of Mayville, in the county of Tuscola, and State of Michigan, have invented certain new and useful Improvements in a Shielded Grab-Hook; and I do hereby declare that the following is a full, clear, and exact description thereof, reference being had to the accompanying drawings, and to the letters of reference marked thereon, which form a part of this specification, in which—

Figure 1 is a perspective of my invention; and

Figure 2, a side view of the hook, showing its mode of construction.

My invention relates to improvements in grab-hooks; and to this end

It consists in the combination of a hook and shield, constructed and arranged to operate substantially as hereinafter set forth.

To enable others skilled in the art to make and use my invention, I will now describe it.

A represents a shield, made something in the shape of a boat, as seen in fig. 1, and provided with a rectangular hole upon each side.

B represents the hook, the construction of which is fully shown in fig. 2.

e is a rectangular slot, terminating in about a three-quarter circle.

It will be observed that the slats in both the hook and shield are made relative to each other. Or, in other words, so that the nose-portion of the hook will enter the foot-portion of the shield, as seen in fig. 1.

The hook B and shield A are confined together by means of the pin d.

I would remark that the slot in the hook is made a little larger than that in the shield, so that when the pin is inserted, the hook will slide freely. Also, that the circular end of the slot is sufficiently large to allow of the hook turning upon it. The advantages of my mode of constructing a grab-hook are, first, the extreme simplicity; second, its certainty of action; and third, its safety when in use.

The purposes to which it can be applied are various, simply by altering the size: for instance, as a fastening of the anchor to the cable; for lines and halters; also as a hook for the ends of a swingletree.

What I claim, and desire to secure by Letters Patent, is—

The combination, substantially as described, of hook B with shield A, constructed and operating as set forth.

In testimony that I claim the foregoing as my own, I affix my signature in presence of two witnesses.

JAMES H. TRACY.

Witnesses:
C. P. WILSON,
M. M ELDER.